No. 628,927. Patented July 18, 1899.
F. DUCHARME.
TOOL HANDLE.
(Application filed Aug. 20, 1898.)

(No Model.)

Witnesses:
William H. Barker
Emma P. Coffin

Inventor:
Francis Ducharme
By Chas. L. Burdett
Attorney.

UNITED STATES PATENT OFFICE.

FRANCIS DUCHARME, OF SHELBURNE FALLS, MASSACHUSETTS.

TOOL-HANDLE.

SPECIFICATION forming part of Letters Patent No. 628,927, dated July 18, 1899.

Application filed August 20, 1898. Serial No. 689,071. (No model.)

*To all whom it may concern:*

Be it known that I, FRANCIS DUCHARME, a citizen of the United States, and a resident of Shelburne Falls, in the county of Franklin and State of Massachusetts, have invented certain new and useful Improvements in Tool-Handles, of which the following is a full, clear, and exact description, whereby any one skilled in the art can make and use the same.

My invention relates to the class of tools in which the shank of the tool is secured within a handle of different material, usually wood; and the object of my invention is to provide a device of this class that shall be simple and cheap of construction and one in which the handle shall be insulated from the tool, usually composed of metal.

To this end my invention consists in the device as a whole, in the combination of parts, and in details and their combination, as hereinafter described, and more particularly pointed out in the claim.

Figure 1:
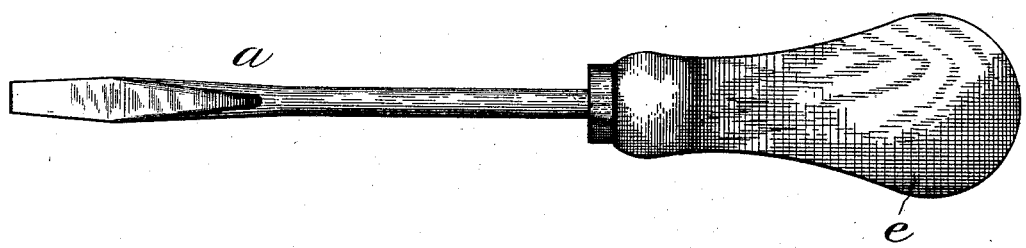
Figure 2:
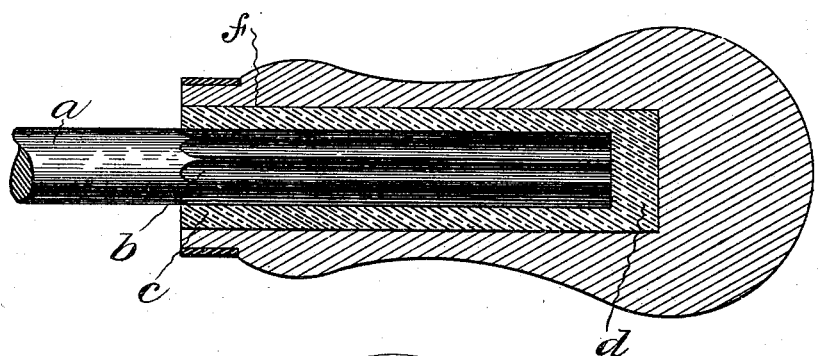
Figure 3:
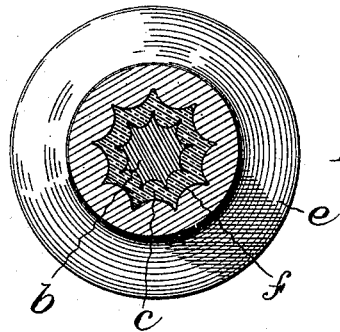

Referring to the drawings, Figure 1 is a side view of a screw-driver including a handle of my improved construction. Fig. 2 is a detail view, on enlarged scale, in horizontal section, through said handle, showing the shank of the tool and with the blade broken off. Fig. 3 is a detail view in cross-section through the handle and shank.

In the accompanying drawings I have chosen a screw-driver as a means of illustrating my invention, said tool being one largely used by electricians, a tool for use in connection with electrical appliances and devices having means whereby the handle is insulated from the metallic portion being especially desirable.

In the accompanying drawings the letter $a$ denotes the blade of a screw-driver, having a shank $b$. This shank is formed of irregular outline in cross-section, in the form of device herein shown corrugations extending lengthwise of the shank being employed, this preventing the rotation of the shank within its casing. A casing $c$ is formed to snugly fit the shank of the screw-driver, the outer surface of the casing being formed in irregular outline in cross-section for the purpose of preventing rotation of the casing within the handle, this irregular outline being also formed by means of corrugations extending lengthwise of the casing. This casing is provided with an end $d$, the construction of the casing in the form shown and described providing a recess into which the shank of the blade fits, the material of the casing completely surrounding said shank as to its sides and inner end and preventing the handle from coming in contact with the shank, thereby completely insulating said handle.

The handle $e$ of the tool is preferably composed of wood of any well-known and convenient form. This handle is provided with a socket $f$ of irregular cross-section conforming to the shape of the outer surface of the casing $c$, which latter fits tightly within the handle.

As shown in the drawings herein, the casing $c$ and shank $b$ are irregularly formed as to cross-section, the angles on each of said parts being located in the same radial line, this construction tending to prevent any rotary movement of the handle independent of the shank by providing obstructions arranged opposite the angles on the shank. These obstructions in the form shown consist of the rounded surfaces in the wooden handle, which are disposed in advance of and in position to oppose the angle on the shank and prevent the compression of any great mass of material of which the casing is composed at one point in a manner to allow a partial movement of the tool-handle independent of the shank.

I do not desire to limit myself to the exact form in cross-section of the parts shown herein, as it is obvious that other forms may be employed to accomplish the result attained and yet come within the scope of the invention.

The device illustrated provides means whereby the handle is perfectly insulated from the blade and prevents any liability from electric shocks by means of a current transmitted from the blade to the handle.

I claim as my invention—

In combination, a blade having a shank of irregular outline in cross-section forming angles, a casing of non-conducting material inclosing the end of the shank and of irregular cross-sectional shape, the angles on the shank and casing being located in the same radial line, and a handle composed of wood inclosing said casing.

FRANCIS DUCHARME.

Witnesses:
MERTON Z. WOODWARD,
CLIFTON L. MCKNIGHT.